Nov. 9, 1943.   N. B. GREEN ET AL   2,333,778
CAMERA SHUTTER COVER
Filed March 14, 1942
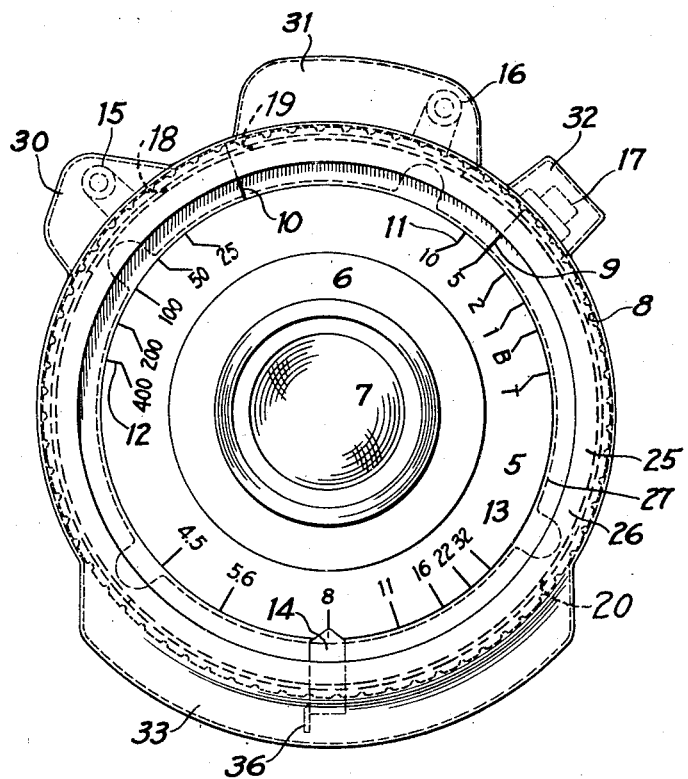
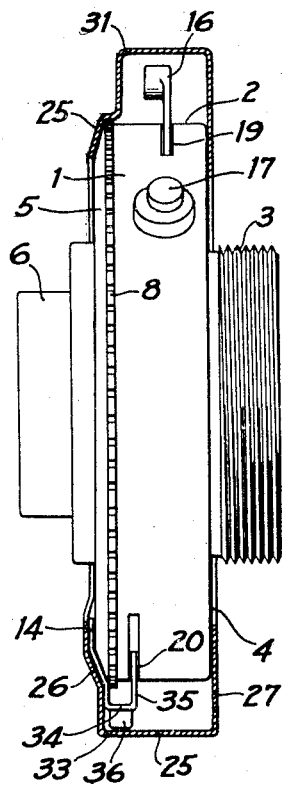
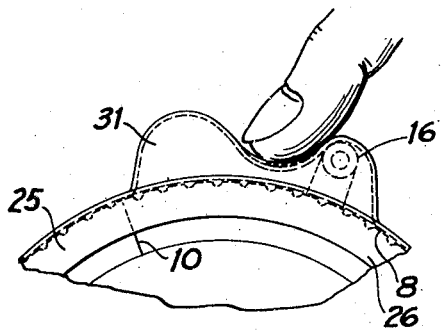
NEWTON B. GREEN
WILLIAM A. RIDDELL
INVENTORS
BY
ATTORNEYS Patented Nov. 9, 1943

2,333,778

UNITED STATES PATENT OFFICE 2,333,778

CAMERA SHUTTER COVER

Newton B. Green and William A. Riddell, Rochester, N. Y., assignors to Eastman Kodak Company, Rochester, N. Y., a corporation of New Jersey Application March 14, 1942, Serial No. 434,704

6 Claims. (Cl. 95—53)

This invention relates to photography and more particularly to covers adapted to be used on photographic shutters to render the shutters substantially dustproof and moistureproof. Most photographic shutters include some form of a casing in which there are slots or other openings through which manually operable parts of the shutter project and move for operating and adjusting various parts of the shutter. In many shutters it is difficult, if not impossible, to provide covers for the openings in the shutter casing so that under the most severe conditions it sometimes happens that dust, dirt, or moisture can enter through the openings in the shutter casing to impair the working of the shutter mechanism.

One object of our present invention is to provide a cover for a photographic shutter so arranged that dust, dirt, moisture, and the like will be excluded from entering any openings in the shutter mechanism so that the mechanism inside the shutter casing may be rendered in operative or rendered less effective. Another object of our invention is to provide a protective cover for a shutter which will permit a normal operation of the usual shutter operating parts in the normal manner and yet which will also protect the shutter mechanism. Still another object of our invention is to provide a shutter cover which can be applied and removed from standard types of shutters now on the market. Other objects will appear from the following specification, the novel features being particularly pointed out in the claims at the end thereof.

Coming now to the drawing wherein like reference characters denote like parts throughout:

Fig. 1 is a front elevation of a well-known type of camera shutter equipped with a protective shutter cover constructed in accordance with and embodying a preferred form of our invention;

Fig. 2 is a part side elevation and part section through the shutter and shutter cover shown in Fig. 1;

Fig. 3 is a fragmentary view of a portion of the shutter cover as it would appear during the manipulation of one of the shutter operating levers; and Fig. 4 is a fragmentary view of a shutter equipped with a shutter cover constructed in accordance with a second embodiment of our invention.

While it is obvious that our invention may be applied to any shutter in the present embodiment, we have shown a shutter casing particularly designed for use on the shutters shown in the following two patents: 2,099,866, Riddell, November 23, 1937, and 2,249,540, Riddell, July 15, 1941. As indicated in these patents the shutter may consist of a casing designated broadly as 1, this shutter casing including an annular rim 2 and a rearwardly extending threaded portion 3 by which the shutter is normally attached to a lens board or camera. The threaded extension 3 is formed on the rear wall 4 of the camera shutter. The front wall 5 or front plate, as it is sometimes called, carries a lens cell 6 in which the front element of an objective 7 may be mounted, it being customary to mount the rear element of the objective inside of the threaded tube 3.

The shutter may be provided with a knurled ring 8 which may be turned to bring one of the pointers 9 or 10 opposite graduations on one of the two scales 11 or 12 to set the shutter mechanism for the desired speed of exposure. On the lower portion of the front plate 5 there is a diaphragm scale 13 and a pointer 14 may be moved over this scale to select the desired diaphragm opening.

As usual in shutters of this type a shutter is provided with a trigger 15 for actuating the shutter mechanism, a setting lever 16 for tensioning the shutter spring and a push button 17 for use in holding the shutter blades open for focusing on a ground glass when desired. The diaphragm pointer 14, the trigger 15, the shutter setting lever 16, and the focusing knob 17 all constitute manually operable members which must move through openings in the shutter casing 1 to operate the shutter. In the case of the shutter trigger 15, it is mounted to move through a slot 18 in the shutter casing. The setting lever 16 is mounted to move through a slot 19 in the shutter casing. The push button 17 is mounted to move through a radial opening in the shutter casing 1 and the diaphragm lever 14 may also be mounted to move through a slot 20. In the present form of our invention, all of these openings extend through the annular rim 2 of the shutter, although in some instances shutters are made with openings which are also provided in the front or rear walls of the shutter casing 1.

In accordance with our invention, we provide a protective shutter cover which can be applied to a shutter such as the one just described in which the slots or openings through which any of the manually operable levers pass will be completely covered and yet will permit the manipulation of these levers so that, under the most severe conditions, dust, dirt, moisture, and the like will be excluded from the shutter mechanism within the casing 1.

A preferred form of our invention consists of an elastic annular member 25 which is substantially U-shaped in cross section, that is, as indicated in Fig. 2, there is an inwardly extending ring-like edge 26 which encloses a portion of the front of the shutter and a similar ring-like flange 27 which encloses a portion of the rear wall 4 and the shutter.

In order to provide a protective cover which at the same time will permit the various levers to be operated successfully, we prefer to provide bag-like extensions from portions of the cover member so as to provide an operating space for the various levers and so as to permit their manipulation through the thin elastic extension.

As indicated in Fig. 1, the trigger is covered by an extension 30 which is of a size and shape to permit the trigger to move freely from the position shown to a position in which the shutter mechanism may be tripped. This bag-like extension 30 is preferably somewhat wider than the width of the trigger 15 and is preferably of such a shape that throughout the movement of the trigger the walls of the bag-like extension will not prevent free movement thereof.

Opposite the setting lever 16, there is a second bag-like extension 31 which similarly encloses the setting lever 16. As indicated in Fig. 3, when the shutter is to be set the operator merely presses the lever 16 toward its set position by pressing directly through the walls of the bag-like extension 31. It should be noticed that we provide this bag-like extension with very thin and very elastic walls, so that it offers practically no resistance to the hand of an operator moving the shutter trigger lever enclosed by the bag-like extension of the protective cover.

The push button 17 may be covered by still another extension 32 and the diaphragm lever 14 may be covered by still another bag-like extension 33.

Our diaphragm cover is somewhat different from the ones previously described in that, as best shown in Fig. 2, the diaphragm lever 14 passes up over a portion of the front plate 5 and extends down below the rim 2 of the shutter casing being formed inwardly at 34 and upwardly at 35 to pass through the slot 20 in the shutter casing rim. We, therefore, prefer to provide an elongated extension 33 which will completely cover the slot 20 and which will press upon the diaphragm lever 14 so as to form a substantially dust and moistureproof joint between these parts. At the same time the diaphragm lever 14 may be operated either by moving the pointer 14 or by moving the downwardly extending handle 36 provided for this purpose.

The exact shape and form of the protective cover will of course depend entirely upon the shape or form of the shutter which it is designed to protect. However, the cover shown in the present embodiment of our invention is a good example of a protective shutter cover.

While we have found thin sheet rubber very desirable for making a cover of the type described because the resiliency of this material permits the annular cover protector to be snapped into place over a shutter very readily, we also found that there are other suitable substances, such as Koroseal, and that any elastic material could readily be used.

It is desirable to provide an elastic material which is either transparent or semi-transparent because in some instances it is desirable to see the operating parts of the shutter, particularly the scales and pointers such as the scales 11 and 12 and the pointers 9 and 10, through a portion of the protective cover. In Fig. 4 we have illustrated a small section of such a cover and indicate that the cover member 125 may be of the shape of the cover member 25, except that where the cover is transparent we prefer to extend the inner flange 126 up against the bottom of the lens cell 6 and the flange 127 up against the edge of the threaded area 3, as this not only affords additional protection but, when transparent or sufficiently translucent, it does not exclude from the view any portions of this shutter.

It is not necessary to have translucent or transparent material because anyone familiar with photographic shutters can readily operate a shutter with a cover as shown in Fig. 1 made of opaque material because the various manually operable parts all move in the standard way. However it is convenient, particularly for the inexperienced, to use transparent or translucent material.

It will be noticed that with these embodiments of our invention a standard type of shutter can readily be made moistureproof and dustproof by merely snapping one of these shutter covers into place and the covers can also be removed with ease. For most purposes it is not necessary to use a protective shutter cover as described in the present specification, but it has been found particularly useful where shutters are to be operated under extremely unfavorable conditions or where shutters are mounted on the outside of a camera in such a manner that they cannot be protected by the usual folding parts of a standard type of camera.

We claim:

1. A protective cover for camera shutters of the type having a casing, an opening in the casing through which an operative part of the shutter may extend, the shutter casing including a rim and supporting a lens, said protective cover comprising a flexible annular member adapted to fit over the rim of the shutter casing, a flexible bag-like extension on the flexible annular member extending over the opening in the shutter casing through which the operative part of the shutter extends to totally enclose said part and through its flexibility permit the manual actuation of said part while excluding dust or moisture therefrom.

2. A protective cover for camera shutters of the type having a casing, an opening in the casing through which an operative part of the shutter may extend, the shutter casing including a rim having a slot therein and a lever movable through said slot and having a portion extending over the front of the shutter casing, said protective cover comprising a rubber-like product formed substantially annular and U-shaped in cross section and having offset portions also U-shaped in cross section extending outwardly from said annular and U-shaped protective cover portion to overlie the slot in the shutter rim and the offset U-shaped portions to overlie the lever portion extending therefrom, the flexibility of said material sealing said slot and permitting the lever to flex the material as it is moved through the slot.

3. A protective cover for camera shutters of the type having a casing, an opening in the casing through which an operative part of the shutter may extend, the shutter casing including a rim having a slot therein and a lever movable through said slot and having a portion extending over the front of the shutter casing, said protective cover comprising a rubber-like product formed substantially annular and U-shaped in cross section to overlie the slot in the shutter rim and the lever portion extending therefrom, the flexibility of said material sealing said slot and permitting the lever to flex the material as it is moved through the slot, the shape of the protective cover being such that the end portion of the lever extending over the front of the shutter casing may project from an edge of the U-shaped protective cover.

4. A protective cover for photographic shutters of the type including a casing, operating members extending through, openings in the casing, the remaining portions of the casing completely enclosing shutter mechanism, and including means for supporting one or more lens cells, said protective cover comprising an at least partially transparent elastic sheet of material shaped to fit over those portions of the shutter having openings therein, and including bag-like extensions enclosing said operating members and of a shape and flexibility to permit the manual operation of said operating members therethrough.

5. A protective cover for photographic shutters of the type including a casing, operating members extending through, openings in the casing, the remaining portions of the casing completely enclosing shutter mechanism, and including means for supporting one or more lens cells, said protective cover comprising an elastic sheet of material shaped to fit over those portions of the shutter having openings therein, and including bag-like extensions enclosing said operating members and of a shape and flexibility to permit the manual operation of said operating members therethrough, said protective cover including only a relatively small portion overlying those portions of the shutter which completely enclose the shutter mechanism, said cover including openings through which lens cells, which may be carried by the shutter, may project.

6. A protective cover for shutters of the type including a casing having an annular rim, a back wall and cover plate and openings through which manually operable shutter operating levers extend, said protective cover comprising a flexible annular member U-shaped in cross section adapted to cover the shutter rim and the openings in the casing, the annular cover member including enlarged portions positioned to lie opposite said openings of thin, flexible material whereby the manually operable levers may be operated through the thin, flexible walls thereof, the shape of said enlarged portions being such as to permit free movement of the enclosed shutter operating levers.

NEWTON B. GREEN.
WILLIAM A. RIDDELL.